United States Patent
Li et al.

(10) Patent No.: US 8,229,192 B2
(45) Date of Patent: Jul. 24, 2012

(54) METHODS AND APPARATUS TO PROCESS LEFT-VENTRICLE CARDIAC IMAGES

(75) Inventors: Shuo Li, London (CA); Ian Ross, London (CA); Richard Rankin, London (CA)

(73) Assignee: General Electric Company, Schenectady, NY (US)

( * ) Notice: Subject to any disclaimer, the term of this patent is extended or adjusted under 35 U.S.C. 154(b) by 1012 days.

(21) Appl. No.: 12/190,311

(22) Filed: Aug. 12, 2008

(65) Prior Publication Data

US 2010/0040270 A1    Feb. 18, 2010

(51) Int. Cl.
*G06K 9/00* (2006.01)
(52) U.S. Cl. ........................................ 382/128
(58) Field of Classification Search .................. None
See application file for complete search history.

(56) References Cited

U.S. PATENT DOCUMENTS

| 6,295,464 | B1 | 9/2001 | Metaxas |
| 2005/0074154 | A1 | 4/2005 | Georgescu et al. |
| 2008/0077032 | A1 | 3/2008 | Holmes et al. |
| 2009/0136103 | A1* | 5/2009 | Sonka et al. ............ 382/128 |
| 2009/0262982 | A1* | 10/2009 | Markowitz et al. ...... 382/103 |

FOREIGN PATENT DOCUMENTS

WO    2006024974    3/2006

OTHER PUBLICATIONS

Kass, DA, TA Traill, M. Keating, PI Altieri, and WL Maughan. "Abnormalities of Dynamic Ventricular Shape Change in Patients with Aortic and Mitral Valvular Regurgitation: Assessment by Fourier Shape Analysis and Global Geometric Indexes." Circulation Research (1988): 127-38. Web.*

The International Searching Authority, "Notification of Transmittal of the International Search Report," issued in connection with counterpart international application No. PCT/US2009/050478, mailed Sep. 4, 2009, 3 pages.

The International Searching Authority, "International Search Report," issued in connection with counterpart international application No. PCT/US2009/050478, mailed Sep. 4, 2009, 4 pages.

* cited by examiner

*Primary Examiner* — Clayton E LaBalle
*Assistant Examiner* — Dennis Hancock
(74) *Attorney, Agent, or Firm* — Hanley, Flight & Zimmerman, LLC

(57) ABSTRACT

Example methods and apparatus to process left-ventricle cardiac images are disclosed. A disclosed example method includes identifying a first landmark point in a first cardiac image, identifying a first centroid of a left ventricle depicted in the first cardiac image, and performing a Cartesian-to-polar transformation to form a first rectangular representation of the left ventricle depicted in the first cardiac image based on the first landmark point and the first centroid.

24 Claims, 5 Drawing Sheets

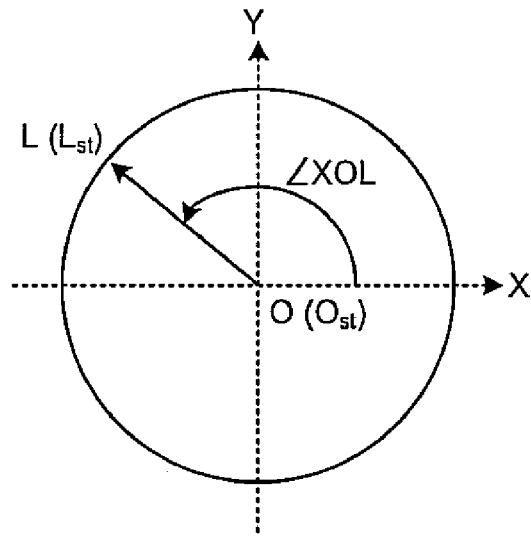
FIG. 3
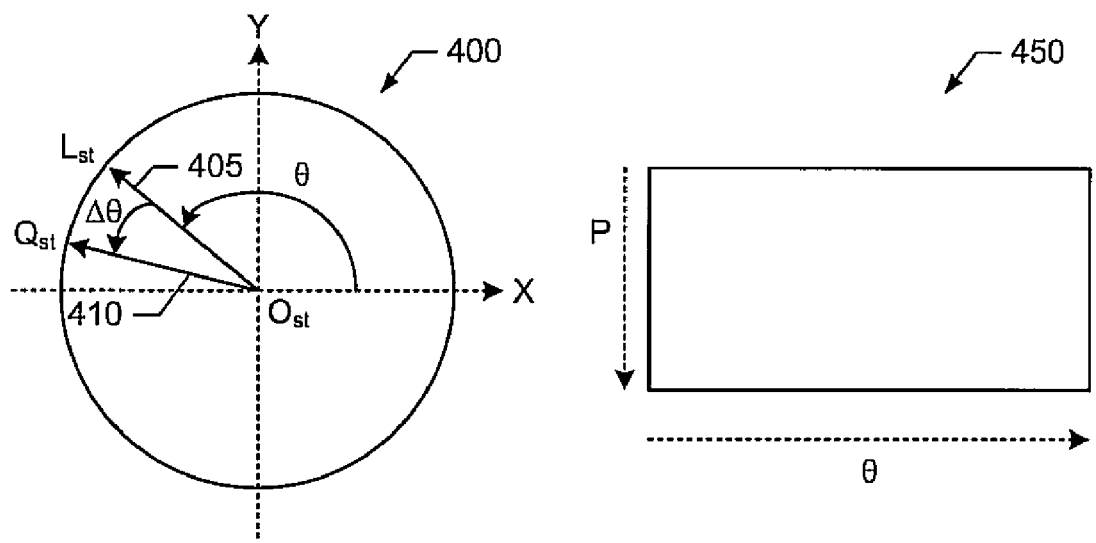
FIG. 4A  FIG. 4B

METHODS AND APPARATUS TO PROCESS LEFT-VENTRICLE CARDIAC IMAGES

FIELD OF THE DISCLOSURE

This disclosure relates generally to left-ventricle cardiac images and, more particularly, to methods and apparatus to process left-ventricle cardiac images.

BACKGROUND

A widely used cardiac diagnostic technique involves the imaging of different portions of a heart during various phases of a heartbeat to detect or diagnose cardiac disease and/or damage. An example cardiac imaging tool is a computed topography (CT) imaging system.

BRIEF DESCRIPTION OF THE INVENTION

Example methods and apparatus to process left-ventricle cardiac images are disclosed. A disclosed example method includes identifying a first landmark point in a first cardiac image, identifying a first centroid of a left ventricle depicted in the first cardiac image, and performing a Cartesian-to-polar transformation to form a first rectangular representation of the left ventricle depicted in the first cardiac image based on the first landmark point and the first centroid.

A disclosed example apparatus includes an input device to allow a user to identify a first landmark point in a first image of a left ventricle, and identify a first centroid of the left ventricle, the first landmark point comprising a junction of a right ventricular wall and an interventricular septum; and a transformer to perform a Cartesian-to-polar transformation to form a first rectangular representation of the left ventricle depicted in the first image based on the first landmark point and the first centroid.

BRIEF DESCRIPTION OF THE DRAWINGS

FIG. 3 is a diagram illustrating an example operation of the example position localizer of FIG. 2.

FIGS. 4A and 4B are diagrams illustrating an example operation of the example transformer of FIG. 2.

DETAILED DESCRIPTION

In the interest of brevity and clarity, throughout the following disclosure references will be made to an example diagnostic imaging workstation 100 of FIG. 1. However, the methods and apparatus described herein to process cardiac left-ventricle images may be implemented by and/or within any number and/or type(s) of diagnostic imaging systems. For example, the methods and apparatus described herein could be implemented by or within a device and/or system that captures diagnostic images (e.g., a computed tomography (CT) imaging system), and/or by or within a system and/or workstation designed for use in viewing, analyzing, storing and/or archiving diagnostic images (e.g., the GE® picture, archiving and communication system (PACS), and/or the GE advanced workstation (AW)).

Figure 1:
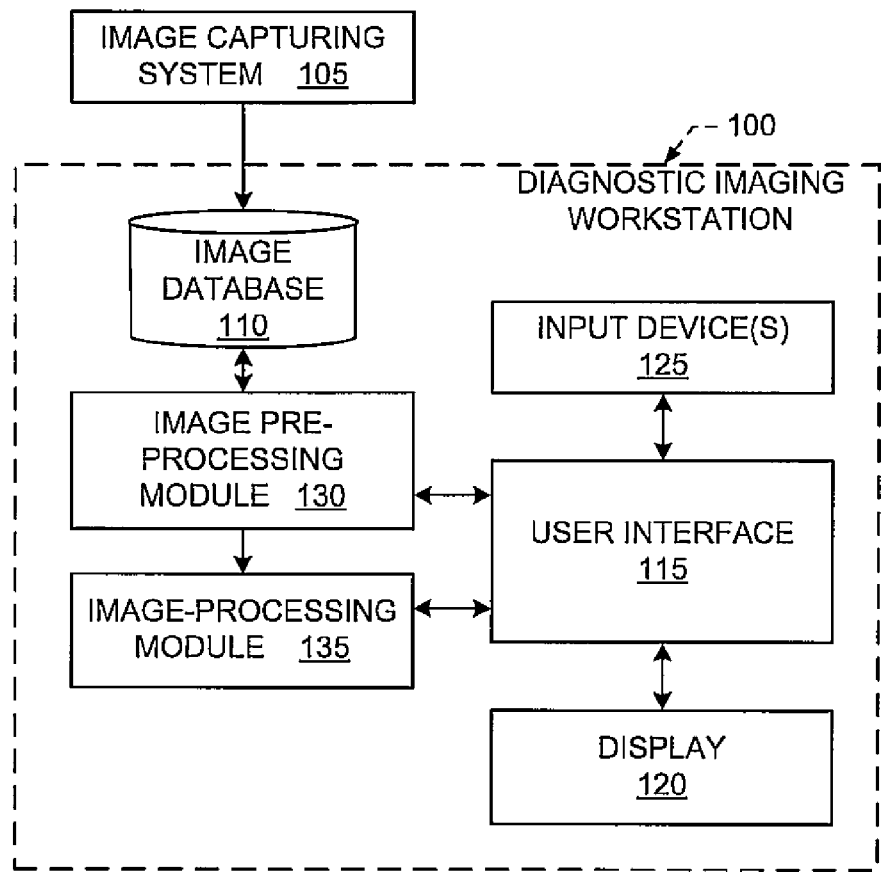
FIG. 1 is a schematic illustration of an example diagnostic imaging workstation within which the example methods and apparatus described herein may be implemented.

FIG. 1 is a schematic illustration of an example diagnostic imaging system within which the example methods and apparatus described herein may be implemented. To capture diagnostic images, the example diagnostic imaging system of FIG. 1 includes any number and/or type(s) of image capturing systems, one of which is designated at reference numeral 105. An example image capturing system 105 includes a CT scanner.

To store images captured and/or collected by the example image capturing system 105, the example diagnostic imaging workstation 100 of FIG. 1 includes an image database 110. Images may be stored and/or archived in the example image database 110 of FIG. 1 using any number and/or type(s) of data structures, and the example image database 110 may be implemented using any number and/or type(s) of memory(-ies), memory device(s) and/or storage device(s) such as a hard disk drive, a compact disc (CD), a digital versatile disc (DVD), a floppy drive, etc.

To allow a user (not shown) to interact with the example diagnostic imaging system 100 of FIG. 1, the diagnostic imaging system 100 includes any type of user interface module 115, any type of display 120 and any number and/or type(s) of input devices 125. The example user interface module 115 of FIG. 1 implements an operating system to present information (e.g., images, windows, screens, interfaces, dialog boxes, etc.) at the display 120, and to allow a user to control, configure and/or operate the diagnostic imaging workstation 100. The user provides and/or makes inputs and/or selections to the user interface module 115 and/or, more generally, to the example diagnostic imaging workstation 100 via the input device(s) 125. Example input devices 125 include, but are not limited to, a keyboard, a touch screen and/or a mouse. In an example, a patient search window is presented at the display 120, and the input device(s) 125 are used to enter search criteria to identify a particular patient. When a patient is identified and selected, the example user interface 125 presents a list of available diagnostic images for the patient at the display 120, and the user selects one or more particular diagnostic images using the input device(s) 125. The user interface 115 then obtains the selected image(s) from the image database 110 and presents them at the display 120 for viewing by the user. In some examples, selected images are processed by an image pre-processing module 130 and/or an image-processing module 135 before presentation at the display 120. Using the input device(s) 125, the user may, for example, zoom-in on particular features of a diagnostic image and/or activate automated image pre-processing, processing and/or recognition features implemented by the diagnostic imaging workstation 100. As described below in connection with FIGS. 2, 3, 4A and 4B, the input device(s) 125 may be used to identify, locate and/or specify particular features of a diagnostic image (e.g., a junction point between a right ventricular wall and an interventricular septum, and/or the centroid of a left ventricle) that are subsequently used by the image pre-processing module 130 and/or the image processing module 135 during image processing.

To process diagnostic images, the example diagnostic imaging workstation 100 of FIG. 1 includes the example image pre-processing module 130 and the example image processing module 135. The type of image processing performed by the example image pre-processing module 130 of FIG. 1 depends on the type of diagnostic image being processed. For a cardiac left-ventricle image, the example image pre-processing module 130 of FIG. 1 performs a Cartesian-to-polar transformation to represent and/or depict the generally circularly shaped left ventricle in a rectangular image. The example image pre-processing module 130 also performs position localization to account for lateral movement, if any, of the left ventricle during imaging, and segments the rectangular image to identify which portions of the rectangular image correspond with which muscles of the left ventricle. An example manner of implementing the example image pre-processing module 130 of FIG. 1 is described below in connection with FIG. 2. An example rectangular image generated by the example image pre-processing module 130 is described below in connection with FIG. 5.

The example image processing module 135 of FIG. 1 implements any number and/or type(s) of image recognition algorithm(s), method(s), logic and/or processing to identify particular features of a diagnostic image and/or set of diagnostic images that may be indicative of a particular medical condition, injury, illness and/or disease. For example, the example image-processing module 135 of FIG. 1 can process a set of rectangular representations of a left ventricle generated by the example image pre-processing module 130 that correspond to different phases of a heartbeat to identify whether one or more muscles associated with the left ventricle are functioning properly. For example, by detecting or determining that a particular left ventricle muscle is not moving or activating in coordination with other left ventricle muscles. By using the rectangular representations generated by the example image pre-processing module 130 rather than the original diagnostic images where the left ventricle has a generally circular shape, the image processing module 135 can perform such analyses of left ventricle images using less complex and/or more accurate algorithm(s), method(s), logic and/or processing. For example, the automated computer-aided diagnosis of left-ventricle images can be improved by more than 20% using the rectangular representations generated by the example image pre-processing module 130.

While one image pre-processing module 130 and one image processing module 135 are illustrated in FIG. 1, a diagnostic imaging workstation 100 may include any number and/or type(s) of such modules. For example, pre-processing and/or processing modules specific to different types of diagnostic images and illnesses may be implemented by the imaging workstation 100.

While an example diagnostic imaging workstation 100 has been illustrated in FIG. 1, one or more of the interfaces, data structures, elements, processes and/or devices illustrated in FIG. 1 may be combined, divided, re-arranged, omitted, eliminated and/or implemented in any other way. For example, the image database 110 may be implemented separately and/or remotely from the diagnostic imaging workstation 100, and/or the image pre-processing module 130 and/or the image-processing module 135 may be implemented in another device that is communicatively coupled to the diagnostic imaging workstation 100. Further, the example image database 110, the example user interface 115, the example display 120, the example input device(s) 125, the example image pre-processing module 130, the example image-processing module 135 and/or, more generally, the example diagnostic imaging workstation 100 of FIG. 1 may be implemented by hardware, software, firmware and/or any combination of hardware, software and/or firmware. Thus, for example, any of the example image database 110, the example user interface 115, the example display 120, the example input device(s) 125, the example image pre-processing module 130, the example image-processing module 135 and/or, more generally, the example diagnostic imaging workstation 100 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example image database 110, the example user interface 115, the example display 120, the example input device(s) 125, the example image pre-processing module 130, the example image-processing module 135 and/or, more generally, the example diagnostic imaging workstation 100 are hereby expressly defined to include a tangible computer-readable medium such as a memory, a DVD, a CD, etc. storing the firmware and/or software. Further still, a diagnostic imaging workstation may include interfaces, data structures, elements, processes and/or devices instead of, or in addition to, those illustrated in FIG. 1 and/or may include more than one of any or all of the illustrated interfaces, data structures, elements, processes and/or devices.

Figure 2:
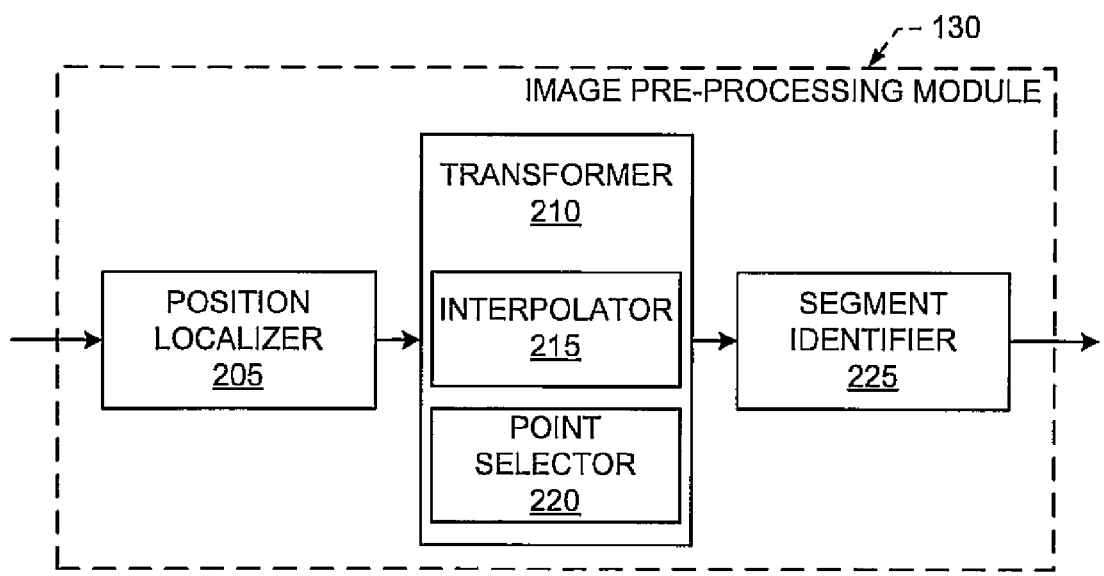
FIG. 2 illustrates an example manner of implementing the example image pre-processing module of FIG. 1.
Figure 5:
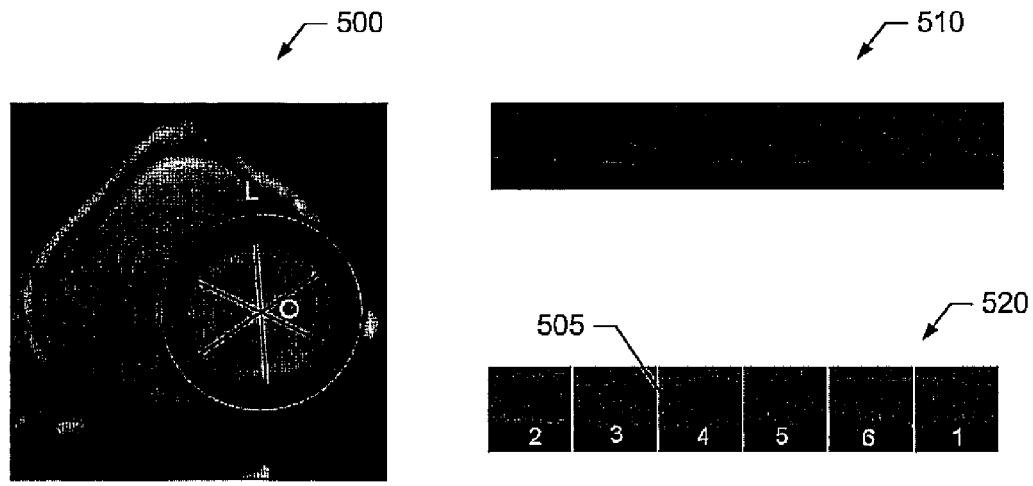
FIG. 5 illustrates an example image of a left-ventricle and a corresponding example rectangular representation of the left-ventricle.

FIG. 2 illustrates an example manner of implementing the example image-processing module 130 of FIG. 1. To account for lateral movement of the left ventricle during a series of CT images (e.g., captured of different portions of the left ventricle and/or during different phases of a heartbeat), the example image pre-processing module 130 of FIG. 2 includes a position localizer 205. Starting with a first CT image 505 (FIG. 5) corresponding to, for example, a basal portion of the left ventricle at the end-diastolic portion of a heartbeat, the example position localizer 205 of FIG. 2 identifies a landmark point L (FIGS. 3 and 5) of the first image and a centroid (i.e., center point) of the left ventricle O (FIGS. 3 and 5). An example landmark point L comprises the junction point between the right ventricular wall and the interventricular septum (see FIG. 5). The example position localizer 205 can identify the landmark point L and the centroid O using, for example, optical recognition, and/or the example user interface 115 to prompt a user to indicate, specify and/or locate the landmark point L and the centroid O via the input device(s) 125.

For other slices (i.e., images) of the patient's left ventricle, the example position analyzer 205 of FIG. 2 identifies the centroid $O_{st}$ of the left ventricle in each slice$_{st}$ (s=1, 2, . . . , S where S is the number of positions at which the left ventricle is imaged, and t=1, 2, . . . , T where T is the number of images collected for each position) via, for example, optical recognition and/or user prompting, and computes a corresponding landmark point $L_{st}$ for each slice$_{st}$ based on its left ventricle centroid $O_{st}$, and the landmark point L and left ventricle centroid O of the first image. The landmark point $L_{st}$ for each slice can be computed by: (a) computing the angle <XOL defined by the X-axis (FIG. 3), the centroid O, and the landmark point L; (b) computing a distance between the centroid O and the landmark L; and (c) selecting the landmark point $L_{st}$ such that the distance from O to L is substantially the same as the distance from $O_{st}$ to $L_{st}$, and the angle <XOL is substantially equal to the angle <$XO_{st}L_{st}$, as shown in FIG. 3.

To perform Cartesian-to-polar transformations, the example image pre-processing module 130 of FIG. 2 includes a transformer 210. Based on the landmark point $L_{st}$ and centroid $O_{st}$, the example transformer 210 of FIG. 2 transforms the generally circular image 400 of a left ventricle (FIG. 4A) into a rectangular representation 450 (FIG. 4B) that is more suitable for subsequent image analysis by, for example, the example image-processing module 135 of FIG. 1. The example transformer 210 uses pixel data falling along radial lines (e.g., a line 405, a line 410) that extend outward from the centroid $O_{st}$ to form the rectangular representation 450. Pixel data from the radial lines 405 and 410 are stored in respective columns of the rectangular image 450. Each of the columns of the rectangular representation 450 corresponds to a particular angle θ of a radial line 405, 410. In the illustrated example of FIGS. 4A and 4B, the radial lines 405 and 410 are equally spaced and correspond to successive counter-clockwise angles θ that are Δθ degrees (or radians) apart. An example value of Δθ is one (1) degree such that the rectangular representation 450 comprises 360 columns. The first column of the example rectangular representation 450 corresponds to the radial line 405 located between the centroid $O_{st}$ and the landmark point $L_{st}$. Subsequent radial lines 410 are located between the centroid $O_{st}$ and a point $Q_{st}$, which corresponds to the landmark point $L_{st}$ rotated by Δθ degrees (or radians). This process is repeated until the next point $Q_{st}$ corresponds to the original landmark point $L_{st}$.

Because diagnostic images are captured using rectangular sampling, the example radial lines 405, 410 may not have the same number of associated pixels. To normalize the number of pixels that occur on the radial lines 405 and 410, the example transformer 210 includes an interpolator 215. Using any number and/or type(s) of algorithm(s), method(s), and/or logic, the example interpolator 215 interpolates the pixel values that occur substantially on and/or nearby a particular radial line 405, 410 between the centroid $O_{st}$ and the landmark point $L_{st}$ to generate or form a set of interpolated pixel values for that radial line 405, 410. In the illustrated example of FIG. 4B, the interpolator 215 interpolates the pixel data falling along a radial line 405, 410 of the original image 400 to obtain P pixel values. Thus, regardless of the number of original pixels that occur along a radial line 405, 410, each column of the rectangular representation 450 has the same number of pixel values. Because of the normalization implemented by the example interpolator 215, the size of the rectangular representation 450 does not depend on the size of the left ventricle and does not vary from patient to patient, which further simplifies or improves subsequent image analysis. The example interpolator 215 stores the interpolated pixel values in the corresponding column of the rectangular array 450.

To determine the points $Q_{st}$, the example transformer 210 includes a point selector 220. The example point selector 220 computes the location of a point $Q_{st}$ based on the location of the previous point (e.g., $L_{st}$) and the angle θ associated with the previous point. In particular the point $Q_{st}$ is selected such that the angled defined by the X-axis, $O_{st}$ and the new point $Q_{st}$ is substantially equal to θ=θ+Δθ.

To identify which columns of the rectangular representation 450 correspond to which left ventricle muscles, the example image pre-processor 130 of FIG. 2 includes a segment identifier 225. The example segment identifier 225 of FIG. 2 delineates and/or identifies which columns of the rectangular image 450 correspond to which muscles by, for example, drawing lines (one of which is designated at reference numeral 505 in FIG. 5 and adding a label (e.g., a number) to identify each of the identified segments. For example, for a basal slice through the left ventricle, segments 1 through 6 correspond to columns 301-360, 1-60, 121-180, 181-240 and 241-300, respectively, as shown in FIG. 5. For a mid-cavity slice through the left ventricle, segments 7 through 12 correspond to columns 301-360, 1-60, 121-180, 181-240 and 241-300, respectively. For an apical slice through the left ventricle, segments 13 to 16 correspond to columns 15-104, 105-194, 195-284, and 285-360 plus 1-14, respectively.

While an example manner of implementing the example image pre-processing module 130 is illustrated in FIG. 2, one or more of the interfaces, data structures, elements, processes and/or devices illustrated in FIG. 2 may be combined, divided, re-arranged, omitted, eliminated and/or implemented in any other way. For example, if only a single left ventricle image slice$_{st}$ is being processed for a patient, the example position localizer 205 could be omitted. Further, the example position localizer 205, the example transformer 210, the example interpolator 215, the example point selector 220, the example segment identifier 225 and/or, more generally, the example image pre-processing module 130 of FIG. 2 may be implemented by hardware, software, firmware and/or any combination of hardware, software and/or firmware. Thus, for example, any of The example position localizer 205, the example transformer 210, the example interpolator 215, the example point selector 220, the example segment identifier 225 and/or, more generally, the example image pre-processing module 130 may be implemented by one or more circuit(s), programmable processor(s), ASIC(s), PLD(s) and/or FPLD(s), etc. When any of the appended claims are read to cover a purely software and/or firmware implementation, at least one of the example position localizer 205, the example transformer 210, the example interpolator 215, the example point selector 220, the example segment identifier 225 and/or, more generally, the example image pre-processing module 130 are hereby expressly defined to include a tangible computer-readable medium such as a memory, a DVD, a CD, etc. storing the firmware and/or software. Further still, a image pre-processing module may include interfaces, data structures, elements, processes and/or devices instead of, or in addition to, those illustrated in FIG. 2 and/or may include more than one of any or all of the illustrated interfaces, data structures, elements, processes and/or devices.

FIG. 5 illustrates an example cardiac left-ventricle image 500 taken of an actual patient. The example left-ventricle depicted in the image 500 has a corresponding landmark point L and a centroid O. The example transformer 210 of FIG. 2 processes the example image 500 to form a rectangular representation 510 of the left-ventricle of image 500. The example segment identifier 225 adds the corresponding segment identifiers and labels to form a rectangular representation 520. The example image 500 of FIG. 5 corresponds to a basal slice of the left ventricle and so the segments are labeled 1-7 in FIG. 5.

Figure 6:
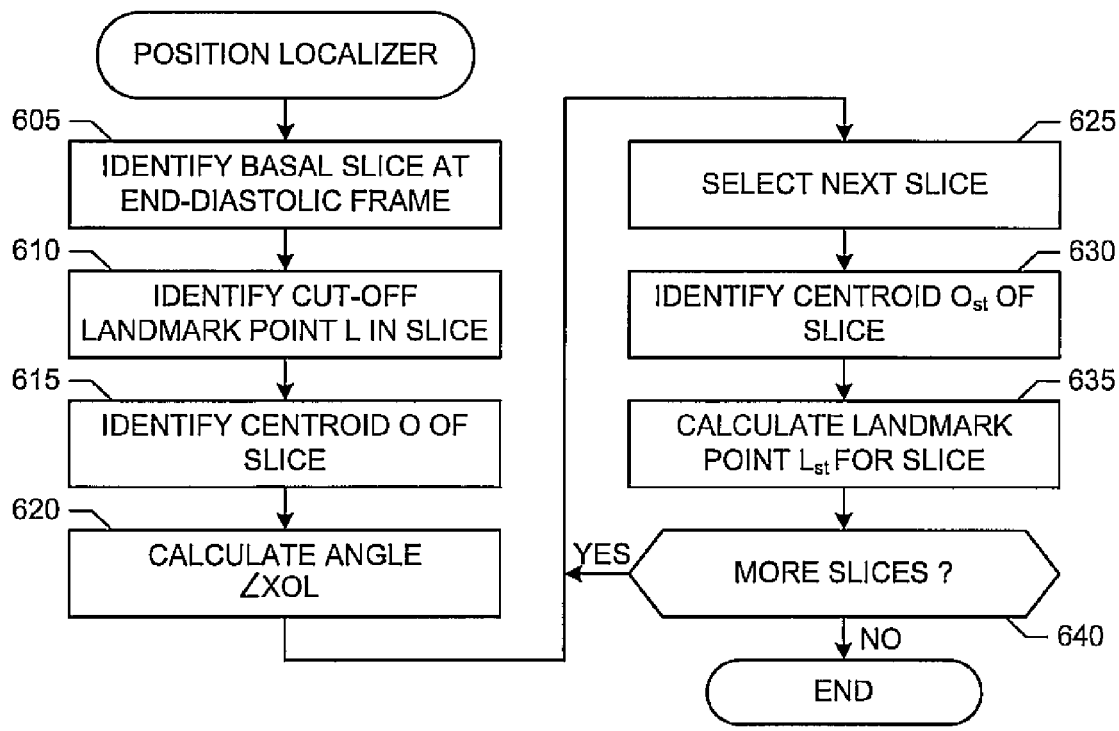
FIG. 6 is a flowchart representative of example process that may be carried out to implement the example position localizer of FIG. 2.
Figure 7:
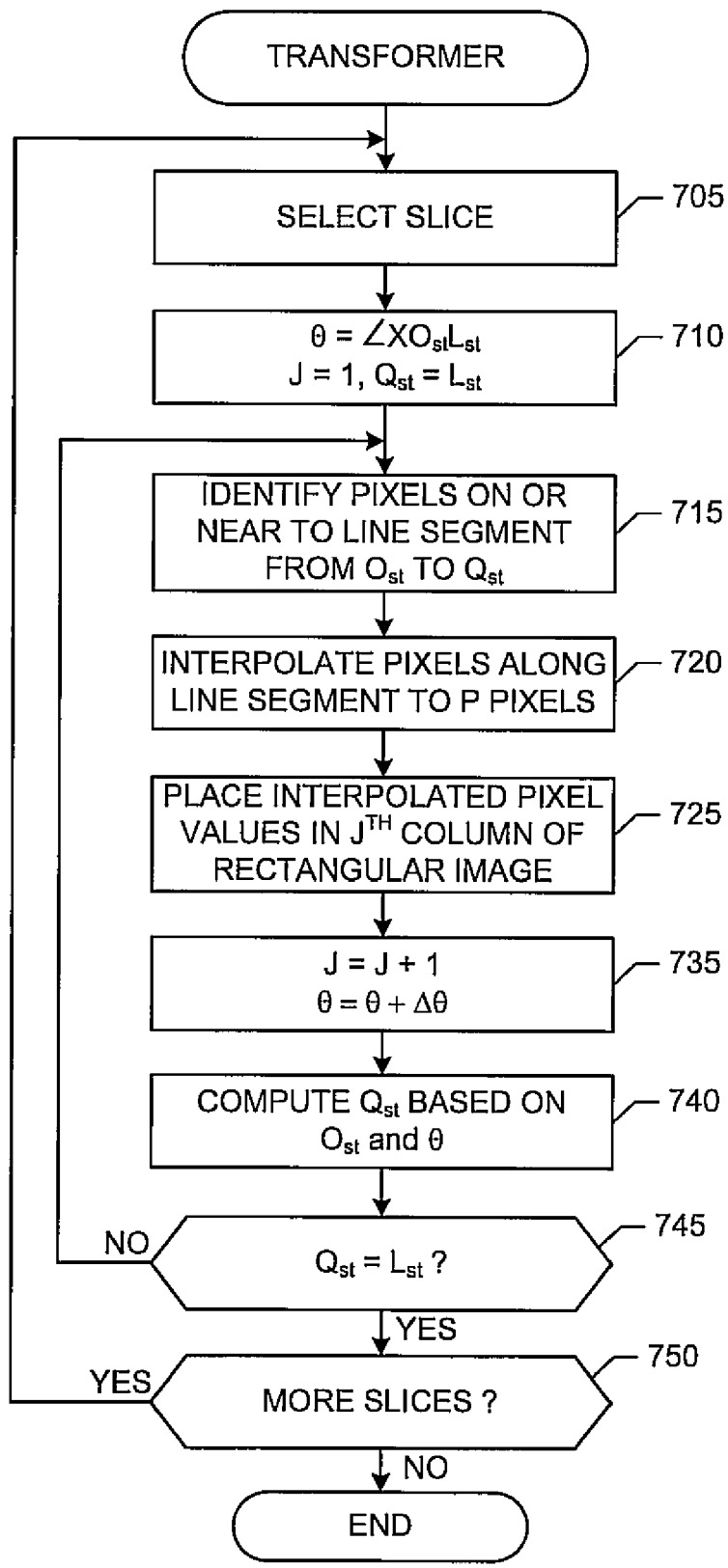
FIG. 7 is a flowchart representative of example process that may be carried out to implement the example transformer of FIG. 2.

FIG. 6 illustrates an example process that may be carried out to implement the example position localizer 205 of FIG. 2. FIG. 7 illustrates an example process that may be carried out to implement the example transformer 210 of FIG. 2. The example processes of FIGS. 6 and/or 7 may be carried out by a processor, a controller and/or any other suitable processing device. For example, the example processes of FIGS. 6 and/or 7 may be embodied in coded instructions stored on a tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of computer-executable instructions or data structures, and which can be accessed by a processor, a general purpose or special purpose computer or other machine with a processor (e.g., the example processor platform P100 discussed below in connection with FIG. 8). Combinations of the above are also included within the scope of computer-readable media. Computer-executable instructions comprise, for example, instructions and data that cause a processor, a general purpose computer, special purpose computer, or a special purpose processing machine to perform one or more particular processes. Alternatively, some or all of the example processes of FIGS. 6 and/or 7 may be implemented using any combination(s) of ASIC(s), PLD(s), FPLD(s), discrete logic, hardware, firmware, etc. Also, some or all of the example processes of FIGS. 6 and/or 7 may be implemented manually or as any combination of any of the foregoing techniques, for example, any combination of firmware, software, discrete logic and/or hardware. Further, many other methods of implementing the example operations of FIGS. 6 and/or 7 may be employed. For example, the order of execution of the blocks may be changed, and/or one or more of the blocks described may be changed, eliminated, sub-divided, or combined. Additionally, any or all of the example processes of FIGS. 6 and/or 7 may be carried out sequentially and/or carried out in parallel by, for example, separate processing threads, processors, devices, discrete logic, circuits, etc.

The example process of FIG. 6 begins with the example position localizer 205 (FIG. 2) identify a basal slice of the left ventricle corresponding to an end-diastolic portion of a heartbeat (block 605). The position localizer 205 identifies the slice by prompting a user to identify the slice. The position localizer 205 identifies a cut-off landmark point L in the slice (block 610) and the centroid O of the slice (block 615) using, for example, image recognition and/or by prompting the user to identify them. The position localizer 205 calculates an angle formed by the example X-axis (FIG. 3), the centroid O and the landmark point L (block 620).

The position localizer 205 (FIG. 2) selects the next slice to be processed (block 625) and identifies the centroid of the left-ventricle depicted in the next slice (block 630). The position localizer 205 identifies the centroid via image recognition and/or by prompting a user to identify the centroid. As described above in connection with FIGS. 2 and 3, the example position localizer 205 computes a landmark point $L_{st}$ for the presently considered slice (block 635). If there are more slices to be processed (block 640), control returns to block 625 to select the next slice. If there are no more slices to be processed (block 640), control exits from the example process of FIG. 6.

The example process of FIG. 7 begins with the example transformer 210 (FIG. 2) selecting a first slice to process (block 705). The example point selector 220 computes an angled defined by the X-axis, the centroid $O_{st}$ and the landmark point $L_{st}$, sets J=1, and sets the first point $Q_{st}$ equal to the landmark point $L_{st}$ (block 710).

The example interpolator 215 (FIG. 2) identifies pixel values that fall substantially or near to a line segment from $O_{st}$ to $Q_{st}$ (block 715). The interpolator 215 interpolates the identified pixels to form P interpolated pixel values (block 720), and stores the P interpolated pixel values in the $J^{th}$ column of a rectangular representation of the left-ventricle depicted in the presently considered slice (block 725).

The example transformer 210 (FIG. 2) increments J and computes the angle for the next radial line (block 735). As described above, the example point selector 220 computes the point $Q_{st}$ for the next radial line (block 740). If the newly computed point $Q_{st}$ is not equal to the landmark point $L_{st}$ (block 745), control returns to block 715 to process the next radial line.

If the newly computed point $Q_{st}$ is equal to the landmark point $L_{st}$ (block 745), the transformer 210 determines whether there are more slices to be processed (block 750). If there are more slices to be processed (block 750), control returns to block 705 to select the next slice, If there are no more slices to be processed (block 750), control exits from the example process of FIG. 7.

Figure 8:
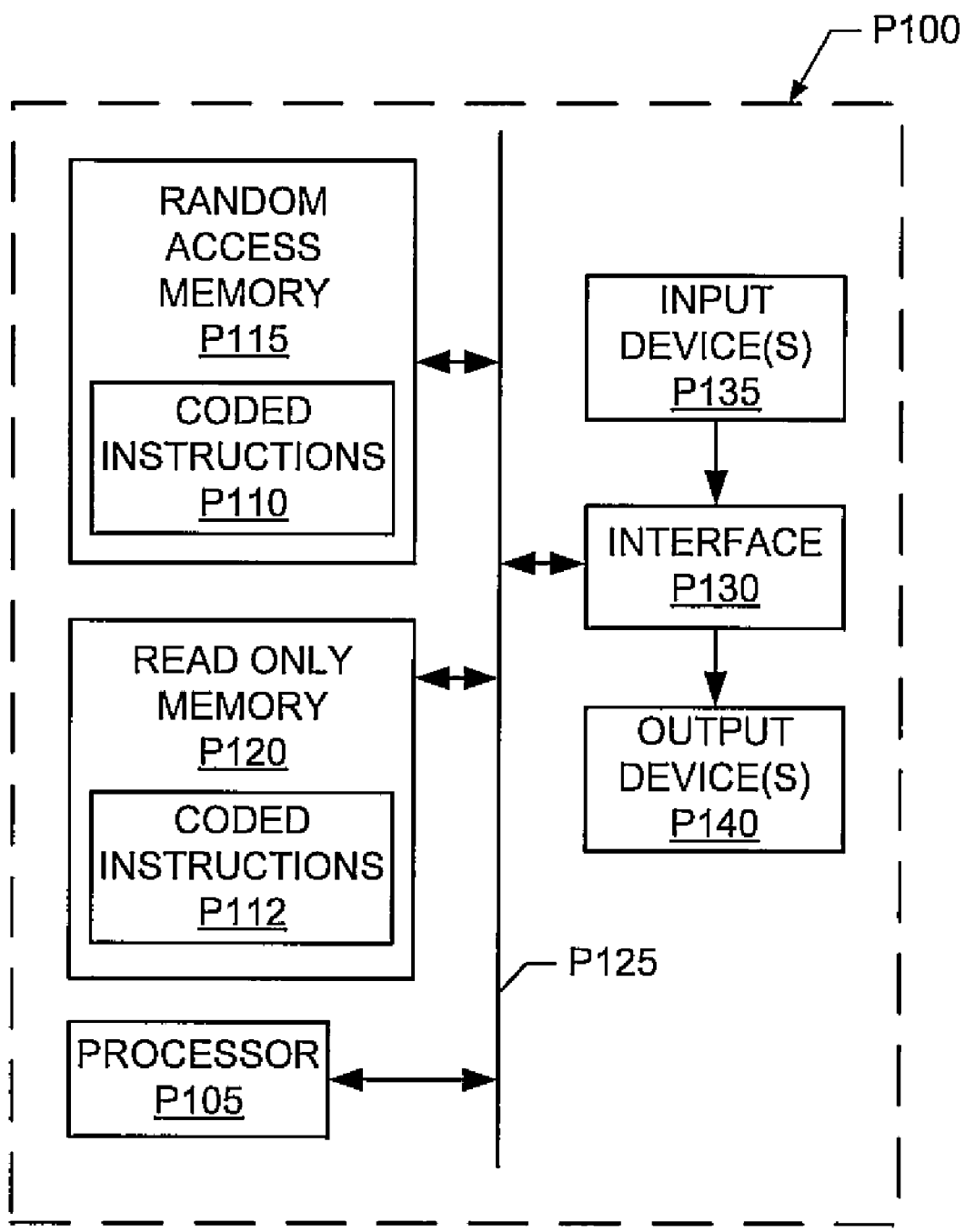
FIG. 8 is a schematic illustration of an example processor platform that may be used and/or programmed to carry out the example processes of FIGS. 6 and/or 7 and/or to implement any or all of the example methods and apparatus described herein.

FIG. 8 is a schematic diagram of an example processor platform P100 that may be used and/or programmed to implement any or all of the example diagnostic imaging workstation 100, the example image pre-processing module 130, the example image-processing module 135, the example position localizer 205, the example transformer 210, the example interpolator 215, the example point selector 220 and/or the example segment identifier of FIGS. 1 and/or 2. For example, the processor platform P100 can be implemented by one or more general-purpose processors, processor cores, microcontrollers, etc.

The processor platform P100 of the example of FIG. 8 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 6 and/or 7 to implement the example cardiac left-ventricle image-processing methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example image database 110 of FIG. 1.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 may be used to, for example, implement the example input device(s) 125 of FIG. 1. The example output devices P140 may be used to, for example, implement the example display 120 of FIG. 1.

Generally, computer-executable instructions include routines, programs, objects, components, data structures, etc., that perform particular tasks or implement particular abstract data types. Computer-executable instructions, associated data structures, and program modules represent examples of program code for executing the processes to implement the example methods and systems disclosed herein. The particular sequence of such executable instructions and/or associated data structures represent examples of corresponding acts for implementing the examples described herein.

The example methods and apparatus described herein may be practiced in a networked environment using logical connections to one or more remote computers having processors. Logical connections may include a local area network (LAN)

and a wide area network (WAN) that are presented here by way of example and not limitation. Such networking environments are commonplace in office-wide or enterprise-wide computer networks, intranets and the Internet and may use a wide variety of different communication protocols. Such network computing environments may encompass many types of computer system configurations, including personal computers, hand-held devices, multi-processor systems, microprocessor-based or programmable consumer electronics, network PCs, minicomputers, mainframe computers, and the like. The example methods and apparatus described herein may, additionally or alternatively, be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   identifying a first landmark point in a first cardiac image;
   identifying a first centroid of a left ventricle depicted in the first cardiac image;
   performing a first Cartesian-to-polar transformation to form a first rectangular representation of the left ventricle depicted in the first cardiac image based on the first landmark point and the first centroid;
   identifying a second centroid of the left ventricle depicted in a second cardiac image;
   computing a second landmark point in the second cardiac image based on the second centroid, the first centroid and the first landmark point; and
   performing a second Cartesian-to-polar transformation to form a second rectangular representation of the left ventricle depicted in the second cardiac image based on the computed second landmark point and the second centroid, wherein the first and second cardiac images depict different portions of the left ventricle.

2. A method as defined in claim 1, wherein a column of the first rectangular representation of the left ventricle represents a radial slice of the left ventricle.

3. A method as defined in claim 1, wherein the first landmark point in the first cardiac image comprises a junction of a right ventricular wall and an interventricular septum, and the first cardiac image comprises a computed tomography (CT) image depicting a basal slice of the left ventricle corresponding to an end-diastolic phase of a heartbeat.

4. A method as defined in claim 1, wherein the first landmark point is identified by at least one of prompting a user to identify the first landmark point, or using optical recognition.

5. A method as defined in claim 1, wherein the first centroid is identified by at least one of prompting a user to identify the first centroid, or using optical recognition.

6. A method as defined in claim 1, wherein performing the first Cartesian-to-polar transformation comprises:
   interpolating first pixel values of the first cardiac image that are substantially coincident with a first line connecting the first centroid and the first landmark point to form first interpolated pixel values; and
   storing the first interpolated pixel values in a first column of the rectangular representation.

7. A method as defined in claim 6, further comprising:
   rotating the first line about the first centroid;
   determining the second landmark point based on an angle of the rotated line and the first centroid;
   interpolating second pixel values of the cardiac image that are substantially coincident with a second line connecting the first centroid and the second landmark point to form second interpolated pixel values; and
   storing the second interpolated pixel values in a second column of the rectangular representation.

8. A method as defined in claim 1, comparing the first and second rectangular representations of the left ventricle to identify a medical condition.

9. A method as defined in claim 1, wherein the first and second cardiac images depict a same portion of the left ventricle during respective phases of a heartbeat.

10. A method as defined in claim 1, wherein computing the second landmark point comprises:
    computing an angle defined by an axis, the first centroid and the first landmark point;
    computing a first distance between the first centroid and the first landmark point; and
    selecting the second landmark point such that a second angle defined by the axis, the second centroid and second landmark point is substantially equal to the first angle, and a second distance between the second centroid and the second landmark point is substantially equal to the first distance.

11. A method comprising:
    identifying a first landmark point in a first cardiac image;
    identifying a first centroid of a left ventricle depicted in the first cardiac image;
    performing a first Cartesian-to-polar transformation to form a first rectangular representation of the left ventricle depicted in the first cardiac image based on the first landmark point and the first centroid;
    designating a first set of columns of the first rectangular representation as corresponding to a first ventricle muscle; and
    designating a second set of columns of the first rectangular representation as corresponding to a second ventricle muscle.

12. An apparatus comprising:
    an input device to allow a user to:
      identify a first landmark point in a first image of a left ventricle; and
      identify a first centroid of the left ventricle, the first landmark point comprising a junction of a right ventricular wall and an interventricular septum; and
      identify a second centroid of the left ventricle depicted in a second image;
    a position localizer to compute a second landmark point in the second cardiac image based on the second centroid, the first centroid and the first landmark point; and
    a transformer to perform a first Cartesian-to-polar transformation to form a first rectangular representation of the left ventricle depicted in the first image based on the first landmark point and the first centroid, and to perform a second Cartesian-to-polar transformation to form a second rectangular representation of the left ventricle depicted in the second image based on the computed second landmark point and the second centroid, wherein the first and second images depict different portions of the left ventricle.

13. An apparatus as defined in claim 12, wherein a column of the first rectangular representation of the left ventricle represents a radial slice of the left ventricle.

14. An apparatus as defined in claim 12, wherein the first image comprises a computed tomography (CT) image depicting a basal slice of the left ventricle corresponding to an end-diastolic phase of a heartbeat.

15. An apparatus as defined in claim 12, wherein the transformer comprises an interpolator to:
   interpolate first pixel values of the first image that are substantially coincident with a first line connecting the first centroid and the first landmark point to form first interpolated pixel values; and
   store the first interpolated pixel values in a first column of the rectangular representation.

16. An apparatus as defined in claim 15, wherein the transformer further comprises a point selector to:
   rotate the first line about the first centroid; and
   determine the second landmark point based on an angle of the rotated line and the first centroid, wherein the interpolator is to:
      interpolate second pixel values of the first image that are substantially coincident with a second line connecting the first centroid and the second landmark point to form second interpolated pixel values; and
      store the second interpolated pixel values in a second column of the rectangular representation.

17. An apparatus as defined in claim 12, wherein the first and second images depict different portions of the left ventricle during respective phases of a heartbeat.

18. An apparatus comprising:
   an input device to allow a user to:
      identify a first landmark point in a first image of a left ventricle; and
      identify a first centroid of the left ventricle, the first landmark point comprising a junction of a right ventricular wall and an interventricular septum;
   a transformer to perform a Cartesian-to-polar transformation to form a first rectangular representation of the left ventricle depicted in the first image based on the first landmark point and the first centroid; and
   a segment identifier to:
      designate a first set of columns of the first rectangular representation as corresponding to a first ventricle muscle; and
      designate a second set of columns of the first rectangular representation as corresponding to a second ventricle muscle.

19. A non-transitory computer readable medium storing machine readable instructions which, when executed, cause a machine to at least:
   identify a first landmark point in a first cardiac image;
   identify a first centroid of a left ventricle depicted in the first cardiac image; and
   perform a first Cartesian-to-polar transformation to form a first rectangular representation of the left ventricle depicted in the first cardiac image based on the first landmark point and the first centroid;
   identify a second centroid of the left ventricle depicted in a second cardiac image;
   compute a second landmark point in the second cardiac image based on the second centroid, the first centroid and the first landmark point; and
   perform a second Cartesian-to-polar transformation to form a second rectangular representation of the left ventricle depicted in the second cardiac image based on the computed second landmark point and the second centroid, wherein the first and second cardiac images depict different portions of the left ventricle.

20. A non-transitory computer readable medium as defined in claim 19, wherein a column of the first rectangular representation of the left ventricle represents a radial slice of the left ventricle.

21. A non-transitory computer readable medium as defined in claim 19, wherein the machine readable instructions, when executed cause the machine to perform the first Cartesian-to-polar transformation by:
   interpolating first pixel values of the first cardiac image that are substantially coincident with a first line connecting the first centroid and the first landmark point to form first interpolated pixel values; and
   storing the first interpolated pixel values in a first column of the rectangular representation.

22. A non-transitory computer readable medium as defined in claim 21, wherein the machine readable instructions, when executed, cause the machine to:
   rotate the first line about the first centroid;
   determine the second landmark point based on an angle of the rotated line and the first centroid;
   interpolate second pixel values of the cardiac image that are substantially coincident with a second line connecting the first centroid and the second landmark point to form second interpolated pixel values; and
   store the second interpolated pixel values in a second column of the rectangular representation.

23. A non-transitory computer readable medium as defined in claim 19, wherein the machine readable instructions, when executed, cause the machine to computer the second landmark point by:
   computing an angle defined by an axis, the first centroid and the first landmark point;
   computing a first distance between the first centroid and the first landmark point; and
   selecting the second landmark point such that a second angle defined by the axis, the second centroid and second landmark point is substantially equal to the first angle, and a second distance between the second centroid and the second landmark point is substantially equal to the first distance.

24. A non-transitory computer readable medium storing machine readable instructions which, when executed, cause a machine to at least:
   identify a first landmark point in a first cardiac image;
   identify a first centroid of a left ventricle depicted in the first cardiac image;
   perform a first Cartesian-to-polar transformation to form a first rectangular representation of the left ventricle depicted in the first cardiac image based on the first landmark point and the first centroid;
   designate a first set of columns of the first rectangular representation as corresponding to a first ventricle muscle; and
   designate a second set of columns of the first rectangular representation as corresponding to a second ventricle muscle.

* * * * *